Feb. 21, 1933.  P. C. LINDER  1,898,134
DRAG CHAIN CLEANER
Filed April 9, 1931   2 Sheets-Sheet 1
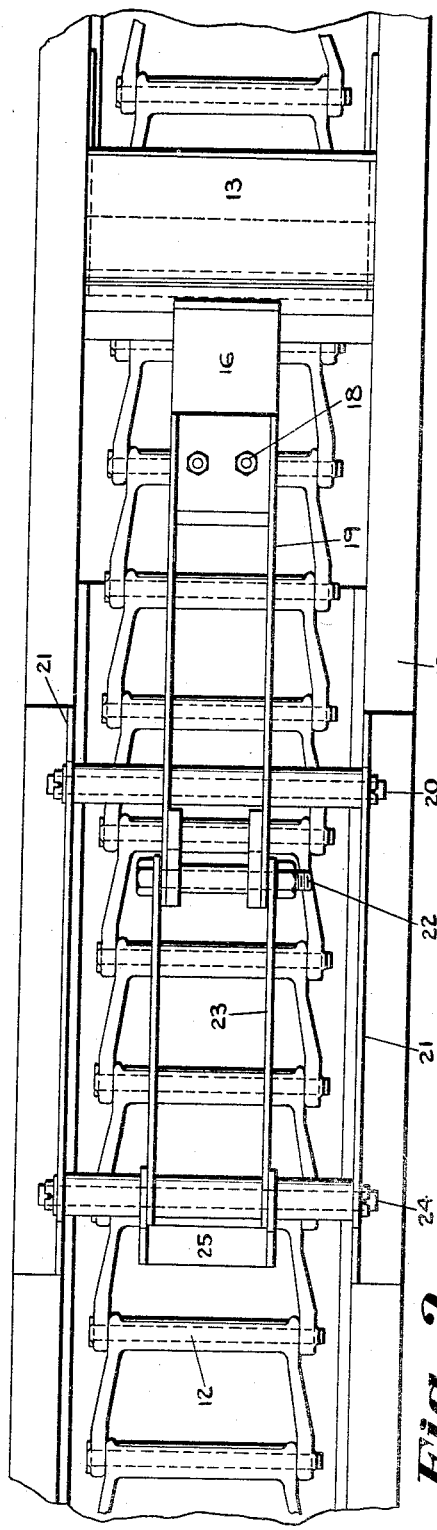
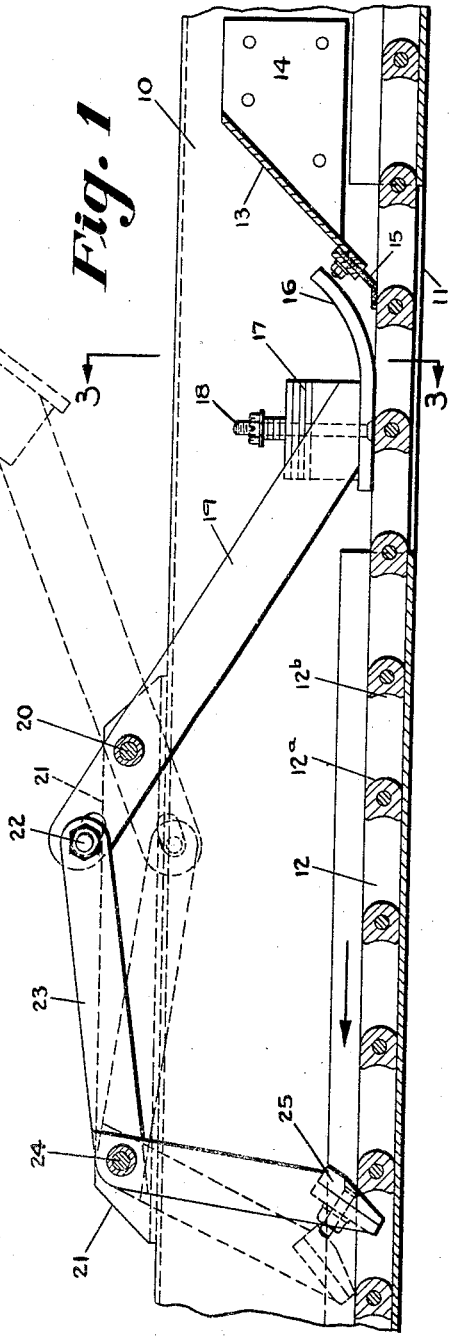
INVENTOR
Paul C. Linder

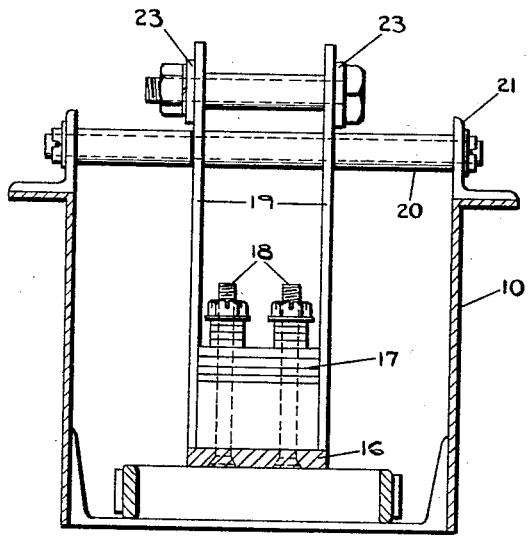

Patented Feb. 21, 1933

1,898,134

UNITED STATES PATENT OFFICE

PAUL C. LINDER, OF COLUMBUS, OHIO, ASSIGNOR TO THE JEFFREY MANUFACTURING COMPANY, OF COLUMBUS, OHIO, A CORPORATION OF OHIO

DRAG CHAIN CLEANER

Application filed April 9, 1931. Serial No. 528,939.

The present invention relates to clearing devices for drive chains such as are used in moving material, such as sand, the coherent properties of which cause it to pack the mass and prevent its free movement and delivery at the point of discharge.

It is an object of the device to provide a positively operated clearing device, which, upon movement of the chain, will periodically clear the chain or like conveying device at the point of discharge, so that no cohering masses adhering to the chain or other conveyor may be carried past the point of discharge.

In order that the invention may be clear to those skilled in the art, one physical embodiment of it is shown in the accompanying drawings, and in said drawings:—

Figure 1 is a view in side elevation, the parts being in section for clearness of illustration of a portion of a conveyor system having the invention applied thereto;

Figure 2 is a plan view of the mechanism shown in Figure 1, looking downwardly; and Figure 3 is a cross section substantially upon the line 3—3 of Figure 1, looking in the direction of the arrows.

Referring to the drawings by numbers, like numbers indicating like parts in the several views, 10 indicates any suitable conveyor trough having, at any desired point in its length, a discharge opening 11 through which the material passing through the trough is delivered and discharged.

Disposed within the trough and adapted to be moved along the bottom thereof is a drag or conveyor chain 12 of any suitable type, here shown as made up of a succession of open link members, pivotally connected, and which will drag the material between the cross bars, through the trough, to the discharge opening 11. Due to the construction of the links forming the chains, in the present illustrated embodiment, the opening in each link is bounded on its forward edge by the barrel of the preceding link forming a rearwardly convex edge 12a, and is bounded on its rear edge by a concave edge 12b. Means for normally discharging the load is provided, and as here shown, comprises a scraper element 13 extending transversely of the trough and suitably secured to the sides of the brackets 14, this scraper element being provided, if desired, with an adjustable toe 15 to permit adjustment to and from the drag chain 12. The scraper element 13 will engage and scrape off the material which may be piled up on and above the plane of the upper faces of the drag chain 12 as it travels past, and force it through the openings between the transverse bars of the drag chain or carrier 12, but if the coherence of the material be high, as in the case of wet sand, for example, it will stick and hang in the interspaces between the links and pass on with the chain. Continuous packing of the material between the chain links may finally result in blocking some at least of the discharge openings in the chain and diminishing the capacity of the conveyor. In order that the material may be surely cleared from the interspaces between the links, there is provided means, which is automatically and periodically operated, to dislodge, by percussion, the material massed in the link spaces.

As here shown, this comprises a weighted shoe or hammer 16, having a stack of adjustable weights 17, so that its mass may be varied, a convenient construction being the provision of the bolts 18 on which the weights may be built up and held, suitable securing nuts and washers, or their equivalent means, being provided to hold the weights snug and prevent chattering.

The hammer 16 is carried by arms 19 pivoted upon a cross rod 20, mounted in suitable brackets 21, carried by the sides of the trough, the ends of said arms 19 being coupled, by a pivot and slot coupling 22, with a bell crank 23, which, in turn, is pivoted at 24 on the brackets 21. One arm of the bell crank 23 depends into the trough and is provided with a foot 25 having a renewable wear plate with an inclined face which lies in the path of the chain links so that the bell crank will be swung from the full line position to the dotted line position shown in Figure 1 as each cross bar of the bracket chain engages it. The bell crank thus manipulated will swing the arms 19, as shown in dotted lines, and elevate the weighted hammer 16. Immediately the transverse bar of the chain link passes the foot 25 of the bell crank 23, the hammer 16 will at once fall and strike the chain 12, to slightly flex the same through the opening 11 and dislodge any compacted material in the openings of the links. It will be observed that the discharge opening 11 is extended sufficiently beyond the scraper 13 so that at least two open links will be above the discharge opening, and the parts are so designed and timed as that the hammer 16 will, as it falls, strike directly upon a cross bar of the drag chain.

With this arrangement, which may be readily adapted and applied to existing forms of trough conveyors, it will be seen that the drag chain, or other open conveyor, will be constantly and periodically cleared of any compacted material in the interspaces of the chain.

It will be understood that such variations from the particular construction here disclosed as involve only mechanical skill or the adoption of equivalent mechanical expedients may be made and still be within the range of my invention.

I claim:—

1. The combination with a drag conveyor for moving material; of automatically acting reciprocatory means actuated by contact with the drag conveyor to dislodge material therefrom.

2. The combination with a conveyor support having a discharge opening, an endless conveyor chain movable over the support and discharge opening; of automatically acting means actuated by the chain to deliver impacts thereto above said opening to dislodge material adhering to the chain.

3. The combination with a conveyor support having a discharge opening, an endless conveyor chain movable over the support and discharge opening; of automatically acting reciprocatory means actuated by the chain to deliver impacts to the chain above said opening to dislodge material adhering to the chain.

4. The combination with a drag conveyor for moving material; of an automatically acting reciprocatory hammer to deliver impacts to the drag conveyor to dislodge material adhering thereto, and means arranged in the path of movement of the drag conveyor and actuated thereby to actuate said hammer.

5. The combination with an endless conveyor chain; of an automatically acting hammer to deliver impacts to the chain to dislodge material adhering thereto, and means arranged in the path of the cross pieces of the chain and actuated thereby to actuate said hammer.

6. The combination with a drag conveyor having a chain for moving material; of an automatically acting reciprocatory hammer to deliver impacts to the drag conveyor to dislodge material adhering thereto, and a bell crank having one arm connected to the hammer and its other end arranged in the path of the cross pieces of the chain to be actuated thereby to actuate said hammer.

7. The combination with a drag conveyor for moving material; of a lever mounted above said drag conveyor, and a bell crank mounted likewise with one arm connected to the lever and its other arm arranged in the path of movement of said drag conveyor to be actuated thereby and to actuate the lever to strike the drag conveyor and dislodge material adhering thereto.

8. The combination with a conveyor support having a discharge opening therein, an endless conveyor chain movable over the same, a lever pivotally mounted above the chain and having a hammer head, a bell crank mounted likewise and having one arm provided with a shoe arranged in the path of movement of the cross pieces of the chain, and the other arm of the bell crank being pivotally connected to the lever to actuate the same and cause the hammer head to deliver successive impacts to the chain above the discharge opening.

9. In a conveyor, an endless draft device having cross pieces, an automatically acting hammer adapted to deliver impacts to the endless draft device to dislodge material adhering thereto, and means arranged in the path of the cross pieces and actuated thereby to operate said hammer.

In testimony whereof I have hereunto set my hand.

PAUL C. LINDER.